United States Patent
Maurice et al.

[15] 3,696,832
[45] Oct. 10, 1972

[54] VALVE ON A COLUMN FOR EXCHANGE BETWEEN FLUIDS

[72] Inventors: Guy Maurice, Poitiers; Yves Jullien, Brioude, both of France

[73] Assignee: Societe Pour L'Equipement des Industries Chimiques speichim, Paris, France

[22] Filed: Dec. 1, 1969

[21] Appl. No.: 881,313

[30] Foreign Application Priority Data

Dec. 2, 1968 France....................68176217

[52] U.S. Cl. ......137/512.1, 137/533.17, 261/114 VT
[51] Int. Cl. .....................F16k 15/00, B01d 47/00
[58] Field of Search..261/114 VT, 114 R; 137/512.1, 137/533.17

[56] References Cited

UNITED STATES PATENTS

| | | | |
|---|---|---|---|
| 2,951,691 | 9/1960 | Nutter | 137/533.17 X |
| 2,959,404 | 11/1960 | Eld et al. | 137/533.17 X |
| 3,210,056 | 10/1965 | Van't Sant | 137/533.17 X |
| 3,245,669 | 4/1966 | Huggins et al. | 137/533.17 X |
| 3,530,879 | 9/1970 | Nutter | 137/512.1 |
| 2,525,064 | 10/1950 | Bragg | 261/114 |

FOREIGN PATENTS OR APPLICATIONS 295,786 3/1964 Netherlands........261/114 VT

Primary Examiner—M. Cary Nelson
Assistant Examiner—David J. Zobkiw
Attorney—Stevens, Davis, Miller & Mosher

[57] ABSTRACT

The specification discloses a pair of valve caps for a phase contacting column in which the valve caps of the pair are linked together underneath the separator plate. The caps may be formed as a single composite unit, as a pair of complete caps for connecting one to another, or as a collection of at least three components which may be assembled to form a composite unit of two caps.

11 Claims, 26 Drawing Figures

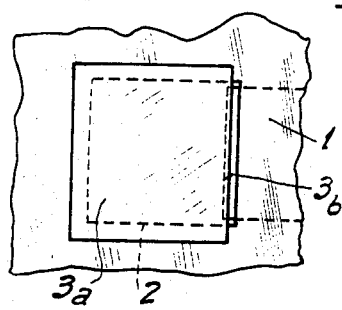
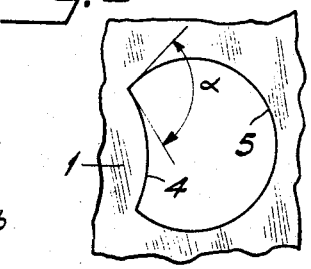
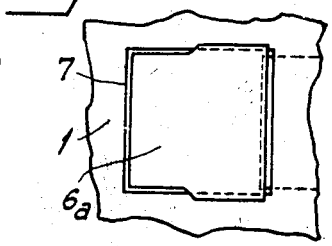
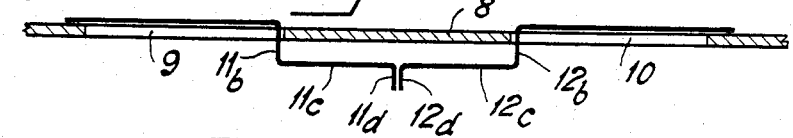
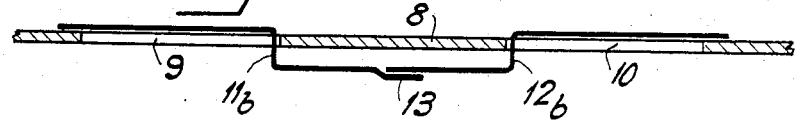
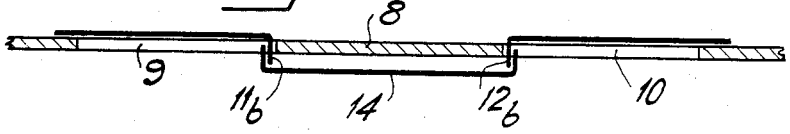
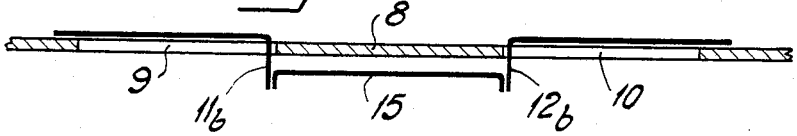
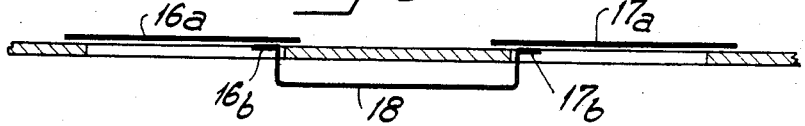
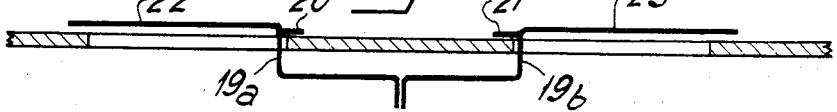

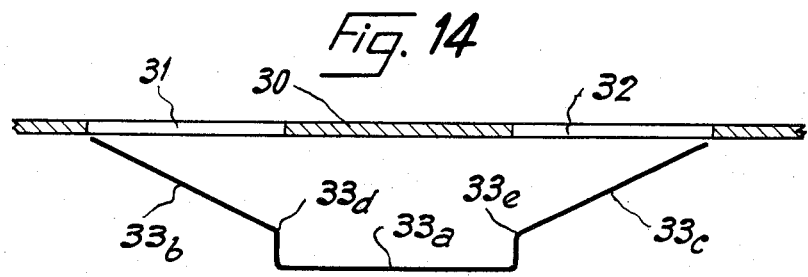
Fig. 14
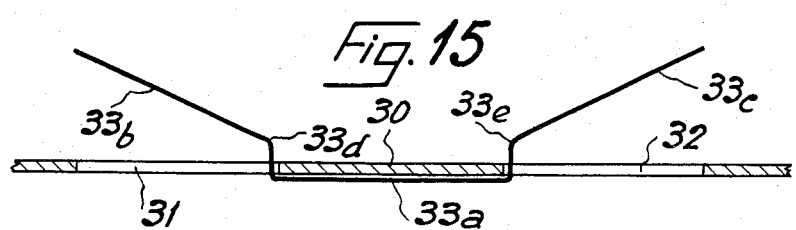
Fig. 15
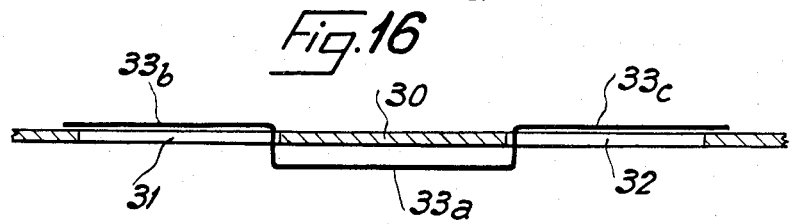
Fig. 16
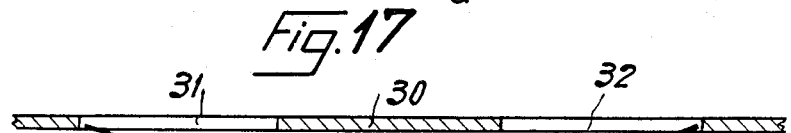
Fig. 17
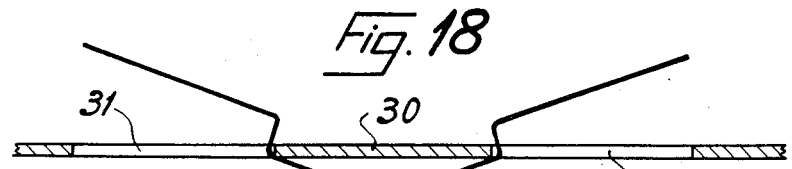
Fig. 18
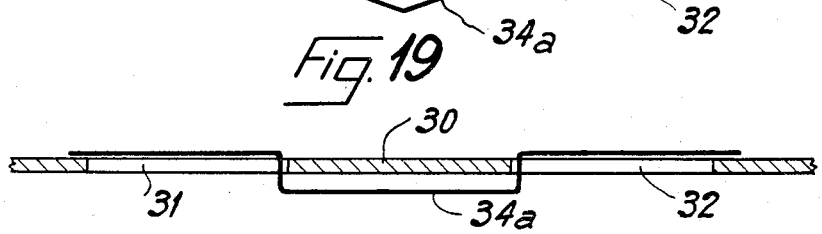
Fig. 19

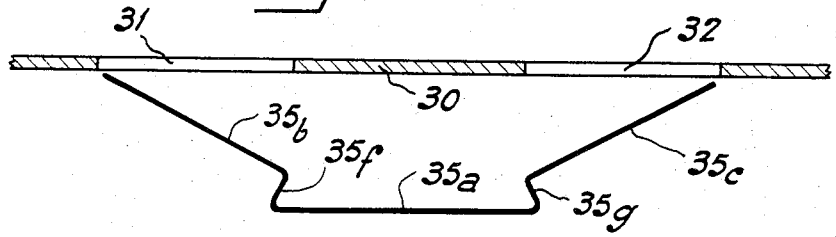
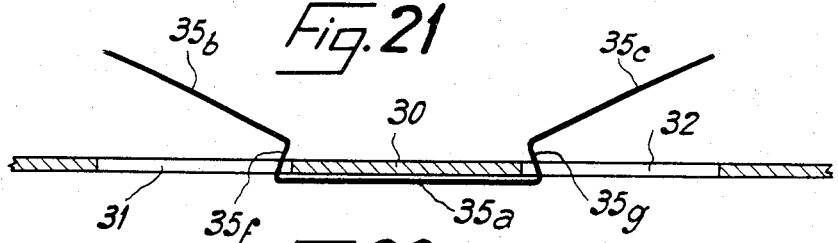
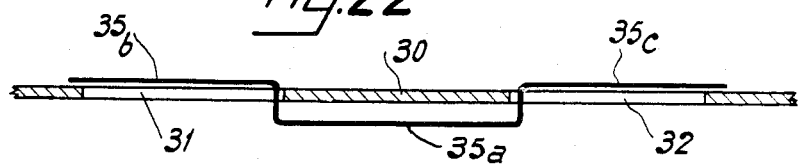
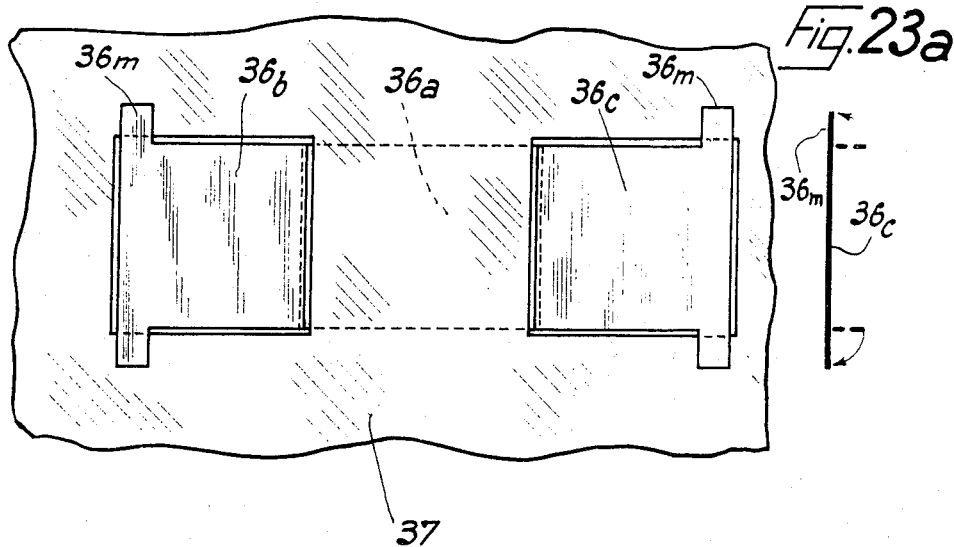

VALVE ON A COLUMN FOR EXCHANGE BETWEEN FLUIDS

It is frequently objected that valve caps for the separator plates or trays of columns for exchange between liquid or gaseous fluids, forming different phases readily escape from their seating, either during transport or when in operation.

According to the present invention we provide a valve cap comprising a plate portion for covering an aperture of a tray and a leg extending downwardly from the plate portion for engaging under the tray, said leg including means for connecting the valve cap to the leg of a valve cap in an adjacent aperture of the tray.

According to a further aspect of the present invention there is provided a valve cap unit for a phase contacting column, and comprising a pair of plate portions each provided with a downwardly extending leg for engagement under a tray, and an interconnecting portion extending between said legs.

In this way, there is constituted a pair of valves which cannot be dislodged upwardly and which, when provided with suitable stop means, may be prevented from being dislodged downwardly either.

The apertures necessary for the passage of the ascending phase (the lighter phase) have any desired shape when viewed in plan. Their periphery may be curvilinear, polygonal or mixtilinear. In order that the valve may not tend to "wobble", it is advisable for that portion of the aperture periphery against which the valve leg bears to be connected to the rest at angles considerably smaller than 180°, preferably at angles not exceeding 135°.

The proportion of the valve forming a cover and intended not only to prevent the lighter phase from ascending directly through the aperture but also to oppose the descent of the heavier phase is, preferably, designed to cover all or almost all of the aperture and even, where appropriate, to project slightly beyond the periphery. However, it may also cover only a portion of the periphery, for example three sides of the rectangle or it may even cover less than a half the periphery.

The plate portion forming a cover may be plane, concave or convex, and may be solid or recessed, and its edge may be flat, corrugated, sloped or serrated, etc.

The leg provided on the valve is preferably formed integrally with the plate portion forming a cover, but it may instead be separate and be secured thereto. Advantageously, the leg may be vertical, its two lateral edges being themselves vertical. The four edges of the assembly of the two associated valves serve for the guiding of the assembly relatively to the assembly of the two associated apertures, in such manner as to prevent the rotation of the paired valves about a vertical axis and horizontal translational movement of the said assembly. On the other hand, the said legs permit either vertical movement of the assembly of the associated valves or rocking about each of the axes of symmetry of the assembly.

The junction under the tray may be effected in various ways, either by providing the legs with laterally projecting portions connected to those of the paired legs, or by providing on each a separate bridge serving to connect them, or finally by providing a bridge so designed as to connect lateral portions of the legs of paired valves. In the first case, the lateral portions of the two paired valves may be in one piece, i.e., these valves are constituted by one and the same element which, suitably, is a cranked strip. Of course, they may also be separate and be assembled in accordance with conventional techniques, for example bolting, riveting, welding, sticking, etc., and these techniques also apply to the mode of assembly between the legs of valves and the intermediate bridge.

The downward movement of the associated valves may be limited by the flange of the portions forming a cover or by the lower portions thereof, for example by turned-down edges or by the lower portions of corrugations. It is also possible, for the same purpose, to provide for example a louvre cut in the leg and raised to the vicinity of the horizontal.

In the upward direction, the vertical movement is limited by that portion of the associated valves which is lodged under the tray, but it may be preferred to limit it by means of upwardly bent stop portions of the said subjacent portion. This latter mode of procedure has the advantage that it permits ready adjustment of the upper limit of movement by means of more or less accentuated relief imparted to the elevated portions.

It may be useful to provide a permanent passage for the light liquid or vapor, even when the valve is bearing on the tray. This may readily be provided, simply by providing a space between the tray and the plane of the plate portion of the valve cap, with the aid of one of the means indicated hereinabove for limiting the downward travel. It is also possible to associate with the valves further passages which are always open and which are located:

either in the portion forming a cover, these being for example slots, apertures, raised nozzles, louvres, etc., or in the leg, these taking the form of slots, apertures, louvres, etc.

The ratio between the flow path cross sectional areas of these permanent passages and the area of the aperture formed in the tray may vary within wide limits, depending on the application concerned and the object which it is desired to achieve (i.e. a pressure drop, considerable operating flexibility, etc.).

In order that the present invention may more readily be understood, the following description is given, merely by way of example, with reference to the accompanying drawings in which:

FIG. 1 shows, in plan view, a portion of a tray having a square valve aperture, and also the associated valve cap, FIG. 2 is a similar view showing an aperture having curvilinear contours, the valve cap being omitted for purposes of clarity, FIG. 3, which is similar to FIG. 1, shows a further embodiment of valve cap;

FIGS. 4 to 9 are diagrams showing, in vertical section, how two paired valve caps may be assembled;

FIGS. 14 to 16, are similar to FIGS. 4 to 9, and illustrate diagrammatically the placing in position of a double valve cap;

FIGS. 17 to 19 and 20 to 22 are sets of three views each showing two further embodiments of double valve caps during various stages of assembly;

Figure 24:
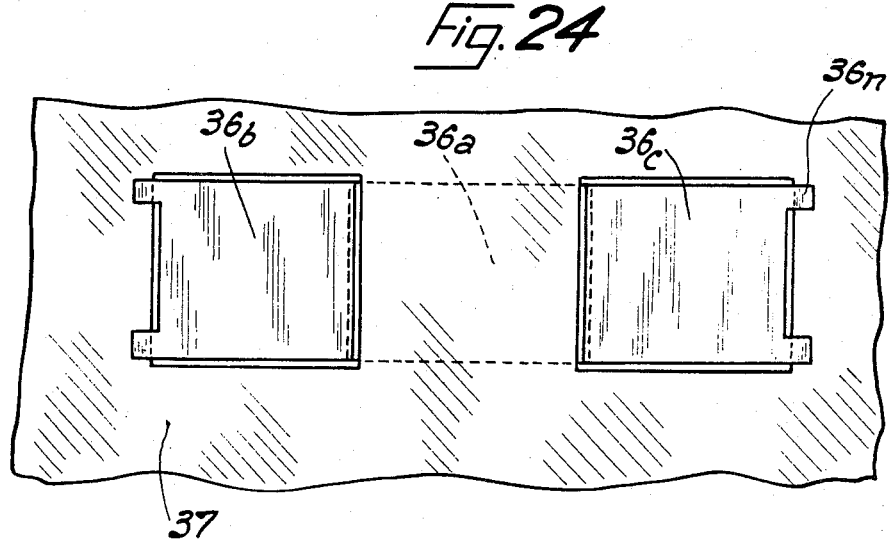
Figure 25:
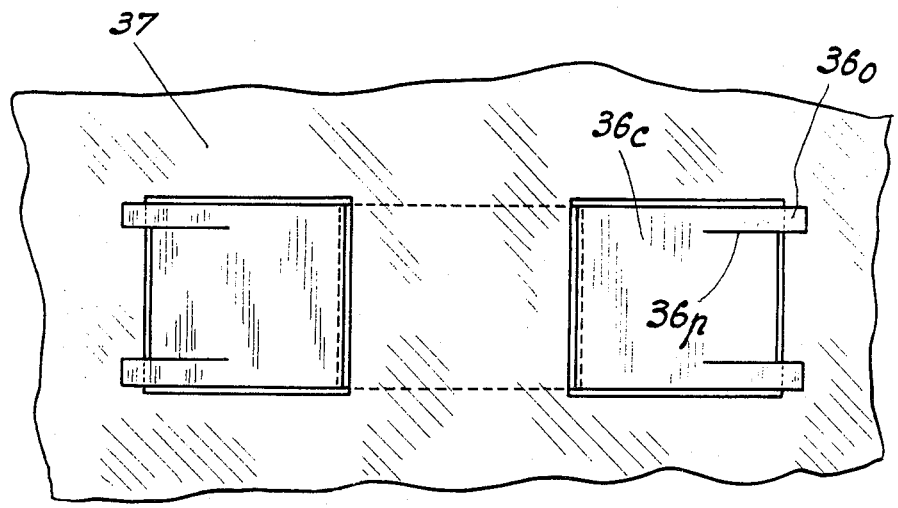

FIGS. 23 and 24 relate to yet a further embodiment which is in this case shown in plan, FIG. 23a being a profile view; and FIG. 25, is similar to FIGS. 23 and 24, and shows still a further embodiment of double valve caps.

Referring to the Example illustrated in FIG. 1, it has been assumed that a tray for a column I has square apertures 2 and that there is associated with each orifice a valve cap comprising a plate portion 3a substantially square in shape and having sides longer than those of the aperture 2. The valve cap is provided laterally with a single perpendicularly downwardly extending leg 3b narrower than the aperture and which descends through the aperture 2 and is then connected, under the tray 1, to the similar leg of an adjacent valve.

As can be seen from FIG. 2, the contours of the aperture may be curvilinear, but they may also be polygonal. In both such cases, it is recommended that the segment 4 facing the adjacent aperture (not shown) which will receive the paired valve cap should be connected to the remainder 5 of the aperture, polygonally, curvilinearly (as in this case) or mixtilinearly with an angle of intersection α which is smaller than 180° and, preferably, does not exceed 135°.

In the embodiment shown in FIG. 3, the plate portion of the valve cap 6a projects relatively to the associated aperture 7 along only a portion of two opposite sides.

In the Examples shown in FIGS. 4 to 9, the tray 8 has two adjacent apertures 9 and 10 respectively.

The legs 11b and 12b of the adjacent valve caps may be extended by horizontal tab portions 11c, 12c which themselves are provided with lugs 11d, 12d assembled together as shown in FIG. 4. Alternatively the tabs may be assembled to overlap at 13 as shown in FIG. 5, the valve caps, when viewed in side elevation thus resembling the steps of a staircase. The legs 11b and 12b may, as shown in FIG. 6, be connected by a bridge 14 having the shape of an erect but flattened U or, as shown in FIG. 7, the bridge 15 may have the form of an inverted flattened U. In the embodiment of FIG. 8, the legs may initially be formed integrally with the connecting bridging element 18, rather than with the plate portion although they are intended to be secured to the said portions 16a, 17a.

In the Example shown in FIG. 9, wherein the legs 19a and 19b are comparable to the legs 11b, 12b of FIGS. 4 to 7, but could instead be formed separately from and subsequently bonded to the plate portions 22 and 23 as shown in FIG. 8. The legs carry stops 20, 21 limiting the descending travel of the valves and maintaining the plate portions which form the covers 22, 23 at some distance above the tray even in the lower-most position. Each stop 20, 21 may be attached to the leg or may instead be produced in the form of a louvre cut in the leg and lifted up into a horizontal position.

Figure 10:
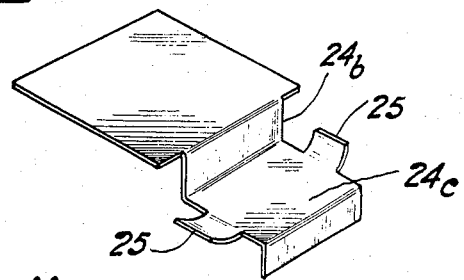
FIGS. 10 to 12 are perspective views of valves having legs of special shape.

FIG. 10 shows, on a valve of the type illustrated in FIG. 4, raised out tongue portions 25 cut out on the edges of the tab portion 24c and raised to a degree which may be varied in accordance with requirements.

Figure 11:
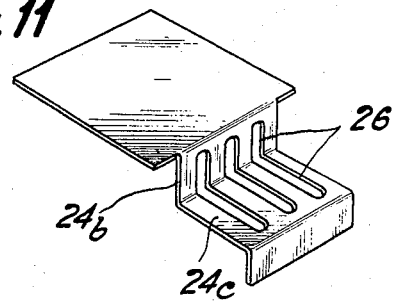
Figure 12:
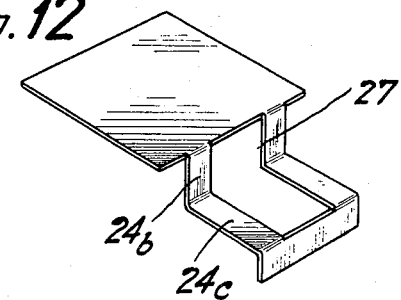

Still with reference to a valve cap of the same type, FIG. 11 shows the formation of supplementary, multiple passages 26 and FIG. 12 shows a wide, single supplementary passage 27, both intended to permit through passage of the lighter phase.

Figure 13:
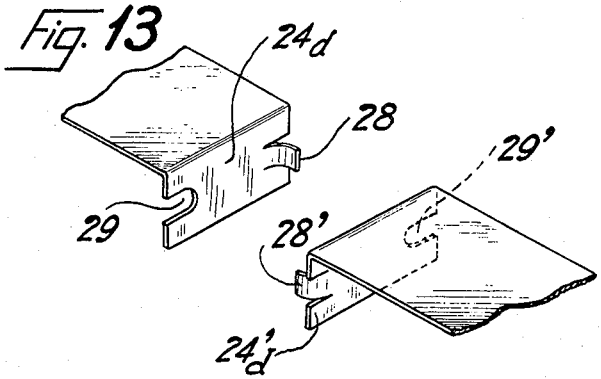
FIG. 13 is similar perspective view showing the legs of a pair of valve caps before joining together.

Referring again to the same type of valve cap, FIG. 13 shows that the lug portions 24d and 24'd of valves intended to be paired may be formed laterally with respective tongues 28, 28' and notches 29, 29' which interpenetrate and maintain the lugs 24d and 24'd in the correct position for assembly, for example bonding by resistance welding.

FIG. 14 shows a tray 30 and two adjacent apertures 31, 32. The double valve cap to be associated therewith is constructed from a single strip of sheet metal the width of which is slightly smaller than that of the apertures. The strip is folded in such manner as to resemble, in the sectional view of FIG. 14, an extremely flat U-shaped central interconnecting portion 33a with, on either side, two upwardly divergent plate portions 33b and 33c which are sufficiently inclined to the plane of the interconnecting portion to make it possible to displace the strip 33a, 33b, 33c, through the underneath part of the plate, from the position shown in FIG. 14 to that shown in FIG. 15. The strip is then deformed at the position of the folds 33d, 33e, so that the plate portions which are required to form valve caps 33b, 33c (FIG. 16) become substantially parallel to the tray 30; as may be seen, the strip may be sufficiently long to enable its ends to cover the remote edges of the apertures 31, 32.

In the case of the embodiment shown in FIGS. 17 to 19, the central interconnecting portion 34a of the strip is initially in the form of an extremely open V instead of being U-shaped and when it is flattened to the FIG. 19 configuration the interconnecting portion adopts the shape shown in FIG. 14 to 16.

In the case of the strip shown in FIG. 20 the central portion of the strip has initially the shape of an extremely flat U the short limbs 35f and 35g of which enclose, with the bottom 35a, angles smaller than 90°, whereas the plate portion 35b, 35c extend at right angles to the short limbs 35f and 35g. When the acute angles are bent open to form right angles as shown in FIG. 22, the strip acquires the shape of the double valve shown in FIGS. 16 and 19.

As may be seen from FIGS. 23 and 23a, the strip 36a, 36b, 36c may initially be folded so that it has the appearance of the double valves of FIGS. 16 and 19 but slightly shorter in order that it may be inserted in its final configuration; through the underneath portion of the separator plate 37. In order that the twin valve cap assembly may not then be dislodged, it carries laterally at its ends retaining tongues 36m which are initially folded upwardly at right angles to the plane of the plate portion as shown in broken lines in FIG. 23a, so as not to constitute an obstruction, and which may then be displaced into the plane of the respective portions 36b, 36c as shown in full lines in FIG. 23a.

Instead of the lateral tongues 36m, it is possible to provide the end tongues 36n, shown in FIG. 24, which are so positioned that they are raised at right angles for fitting and are then subsequently folded down flat.

In order to reduce the angular deformation in folding, the tongues 36o may (as shown in FIG. 25), be delimited by slots 36p inwardly spaced from the edges of the plate portions.

We claim:

1. A fluid exchange valve device comprising, in combination: a horizontally extending tray portion of a phase contacting column, said tray having at least two spaced aperture means therein; a pair of separated valve caps, each comprising a plate portion disposed above respective ones of said apertures, portions of said plates extending outwardly of said apertures over said tray; connecting means rigidly connecting said plate portions to each other, said connecting means extending below said tray and disposed for substantially vertical movement with respect to said tray, the extent of said movement defining the extent of opening of said valve device by said valve caps, said connecting means including a weakened portion enabling folding of the interconnected valve caps for insertion into position in relation to the tray.

2. The combination of claim 1, wherein said weakened portion comprises a deformable fold line extending across said connecting means symmetrically disposed between said plate portions.

3. A fluid exchange valve device, comprising:
a horizontally extending tray portion of a phase contacting column, said tray portion having at least two spaced apertures formed therein;
a pair of separated valve caps, each cap comprising a first cap portion disposed above a respective one of said apertures in at least partial overlapping engagement with one surface of said tray portion in a closed position of said valve device and lying in a plane substantially parallel to the plane of said tray portion; and
connecting means connecting each said first portion to the other, said connecting means comprising:
a second cap portion connected to said first portion extending through said aperture and disposed for substantially vertical movement with respect to said tray portion, the extent of said movement defining the extent of opening of said valve device by said valve caps, and
a third cap portion connected to said second cap portion and disposed adjacent the opposite surface of said tray portion from said first portion, the third portions of each of said caps being connected to each other, said connecting means further comprising at least one foldable and unfoldable portion to permit insertion of said valve caps through said apertures into operative engagement therewith.

4. A valve device as defined in claim 3, wherein said foldable portion is defined at the junction between said first and second portions each of said valve caps.

5. A valve as defined in claim 3, wherein said foldable portion is defined at the junction between said third portions of said valve caps.

6. A valve device as defined in claim 3, wherein said foldable portion is defined at the junction of said second and third portions of each of said valve caps.

7. A fluid exchange valve device, comprising:
a horizontally extending tray portion of a phase contacting column, said tray portion having at least two spaced apertures formed therein;
a pair of separated valve caps, each cap comprising a first cap portion disposed above a respective one of said apertures in at least partial overlapping engagement with one surface of said tray portion in a closed position of said valve device and lying in a plane substantially parallel to the plane of said tray portion; and
connecting means connecting each said first portion to the other, said connecting means comprising:
a second cap portion connected to said first portion extending through said aperture and disposed for substantially vertical movement with respect to said tray portion, the extent of said movement defining the extent of opening of said valve device by said valve caps, and
a third cap portion connected to said second cap portion and disposed adjacent the opposite surface of said tray portion from said first portion, the third portions of each of said caps being connected to each other;
wherein said first, second and third portions of each said cap comprise portions of a single sheet of valve cap material.

8. The combination of claim 7, and including descent limiting stop means extending laterally from each said plate portion for abutting engagement on said tray portion adjacent the associated aperture means.

9. The combination of claim 7, wherein said connecting means comprises a pair of horizontally extending tab portions, one integrally formed with each valve cap.

10. The combination of claim 7, and including cut out means formed in said connecting means for permitting throughflow of fluid during rising and falling of said valve caps.

11. A valve device as defined in claim 7, wherein each of said pair of separated valve caps comprises a portion of said single sheet of material.

* * * * *